June 12, 1934.  N. POWELL  1,962,408
ROTARY MOTOR
Filed Nov. 7, 1931  2 Sheets-Sheet 1

Inventor
Neal Powell

By
Geo. F. Kimmel
Attorney

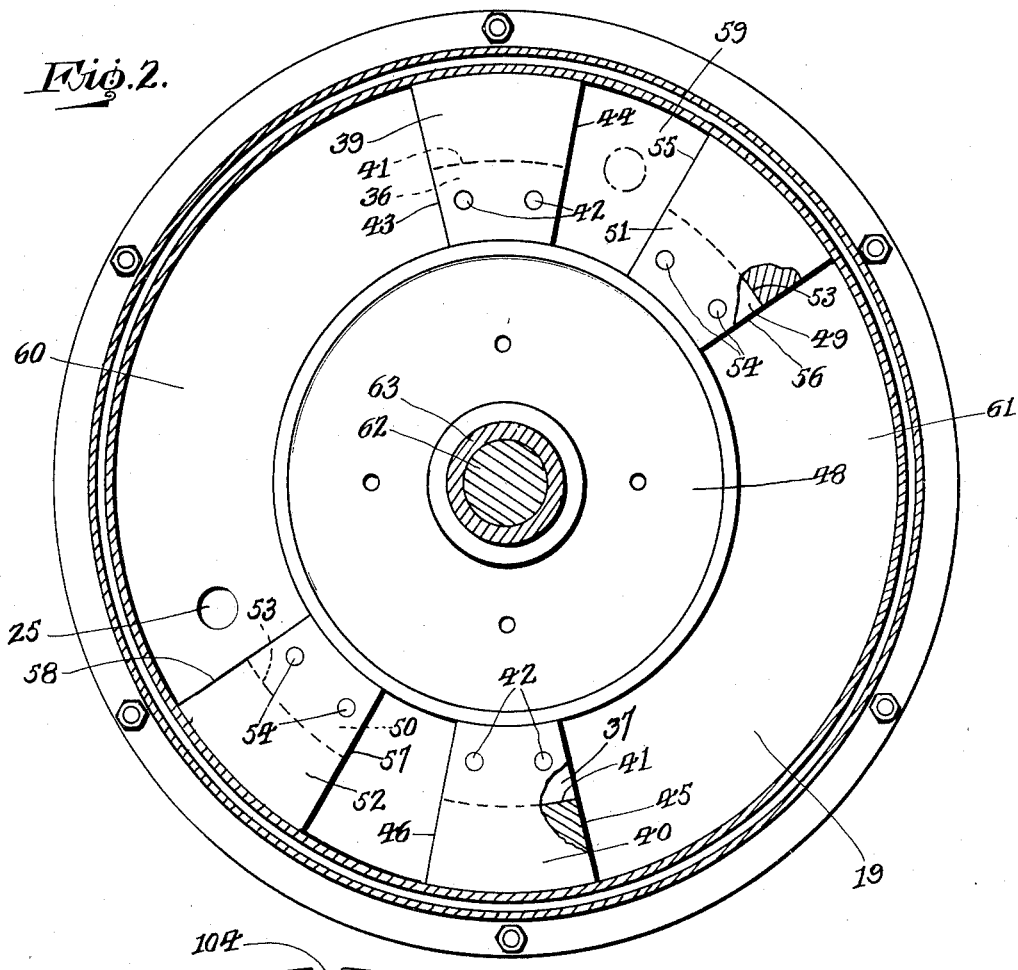
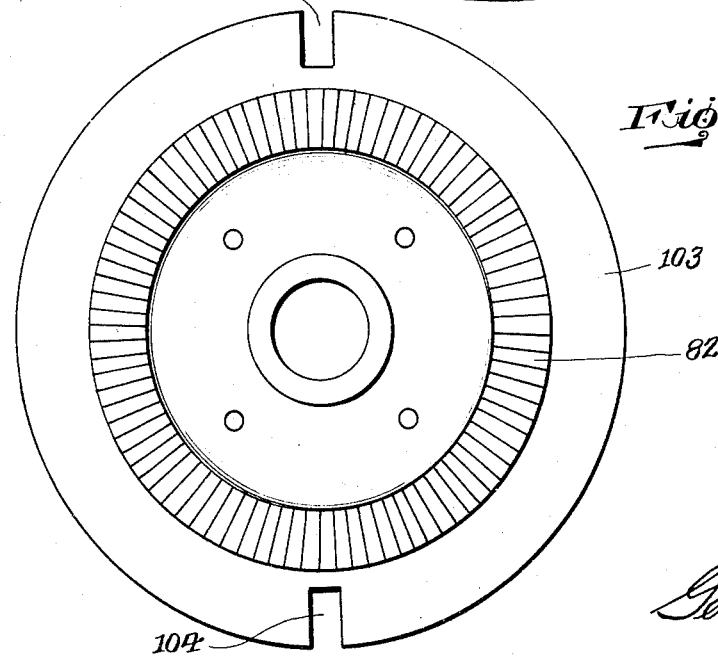

Patented June 12, 1934

1,962,408

UNITED STATES PATENT OFFICE 1,962,408

ROTARY MOTOR

Neal Powell, Wessington Springs, S. Dak.

Application November 7, 1931, Serial No. 573,680

6 Claims. (Cl. 123—11)

My invention relates to a rotary motor.

The essential objects of my invention are to set up a motor of such class for utilizing a tandemwise arrangement of pistons traveling in a circular path and successively driven from the impact of pressure thereagainst to generating power for driving purposes; for utilizing two pair of pistons, arranged tandemwise, the pistons of one pair being alternately disposed with respect to the pistons of the other and with the pistons of each pair being alternately driven in a circular path, by the impact of pressure thereagainst to operate a power transmission mechanism for continuously driving a power transmitting shaft; for dispensing with the use of valves and cam shafts as elements thereof; for utilizing the leading face of each piston for scavenging and compressing and the follower face for the exertion thereon of the pressure employed for driving the piston; for utilizing the follower faces of the piston of one pair and the leading faces of pistons of the other pair for successively providing a combusting space for a combustible charge; for utilizing the leading face of each piston of a pair and the follower face of each piston of the other pair to successively provide an exhaust space for the reception of the exhaust from a combusted charge; and to attain these ends in a strong, durable, thoroughly efficient and comparatively inexpensive structure.

To the above ends essentially my invention consists in such parts and in such combination of parts as fall within the scope of the invention as claimed.

In the drawings:

Figure 2 is a section on line 2—2 Figure 1.

Figure 3 is a view looking toward the inner face of one of the transmission gears.

Figure 1:
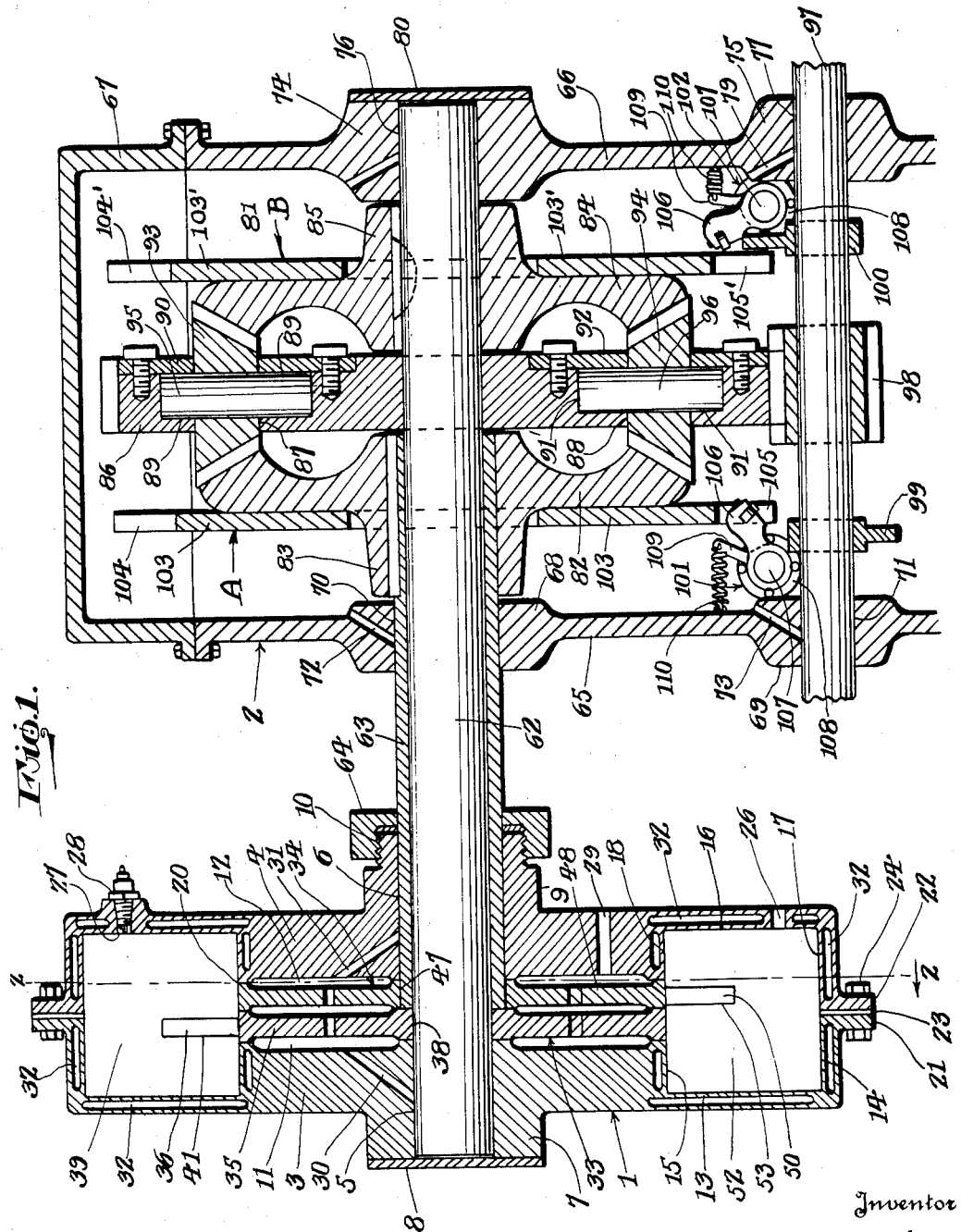
Figure 1 is a longitudinal sectional view of a rotary motor in accordance with my invention.

The motor may be driven from a combusted mixture, steam or compressed air and is shown by way of example as of the internal combustion type and includes a housing 1 for a pair of impeller elements and a housing 2 for a transmission mechanism. The housing 1 is formed of a pair of oppositely disposed sections 3, 4, the former being provided with an axial opening 5 and the latter with an axial opening 6 of greater diameter than opening 5. The section 3 has an integral collar 7 on its outer face which aligns with the wall of opening 5. Secured to collar 7 is a closure plate 8. The section 4 has an integral collar 9 on its outer face which aligns with the wall of opening 6. The outer end of collar 9 is reduced and peripherally threaded as at 10. The inner faces of sections 3, 4 are dished out to form annular cavities 11, 12 opposing each other in spaced relation. Adjacent the outer wall of cavity 11, the inner face of section 3 is formed with an annular groove 13 having its outer wall 14 of greater cross-sectional length than its inner wall 15. Adjacent the outer wall of cavity 12, the inner face of section 4 is formed with an annular groove 16 having its outer wall 17 of greater cross-sectional length than its inner wall 18. The grooves 13, 16 are oppositely disposed and coact to provide an annular chamber 19 having the central portion of its inner wall open as at 20. The sections 3, 4 are formed with outwardly directed opposed annular flanges 21, 22 respectively having a packing 23 interposed therebetween. Holdfast devices 24 extend through the flanges and packing for connecting sections 3, 4 together.

The section 3 is provided with an exhaust port 25 leading from chamber 19. The section 4 is formed with an intake 26 for the combustible charge leading to chamber 19, an opening 27 for communicating with chamber 19 for the reception of a spark plug 28, and a lubricant supply port 29 leading to cavity 12. The sections 3, 4 are provided with inclined lubricant ducts 30, 31 respectively which lead from the cavities 11, 12 respectively and opening at the walls of the openings 5, 6 respectively. The sections 3, 4 are also formed with water cooling spaces 32.

Operating within the housing 1 is a pair of rotary impellers or rotors 33, 34, the former consists of a carrier in the form of a disc 35 provided with a pair of diametrically opposed extensions 36, 37 at the outer edge thereof. The disc 35 has an axial opening 38. Secured to the extensions 36, 37 are pistons 39, 40 respectively which seat against said outer edge and travel against the walls of chamber 19. Each piston increases in width from the disk to the outer wall of chamber 19. Each piston is formed with a groove 41 opening at its inner end. The extensions are arranged in the grooves and are fixedly secured to the pistons by the holdfast devices 42. The piston 39 has an inclined leading face 43 and an inclined follower face 44. The said faces extend at opposite inclinations. The outer and inner ends of the pistons are upon an arc. The piston 40 has an inclined leading face 45 and an inclined follower face 46 and such faces extend at opposite inclinations. Each groove 41 is arranged between the lengthwise median and outer side of the piston. The thickness of the extensions is less than that of the body of the disc, whereby the outer edge thereof will abut the inner end of the pistons.

The construction of the impeller or rotor 34 is the same as that of the impeller 33, with this exception, the arrangement of the grooves in the pistons to receive the extension and setting up the axial opening 47 of impeller 34 of greater diameter than the opening 38 of impeller 33. The impeller 34 includes a carrier in the form of a disc 48 having the axial opening 47, a pair of diametrically opposed extensions 49, 50, pistons 51, 52, having grooves 53 for the extensions, and holdfast devices 54 for securing the extensions to the pistons. The leading and follower faces of piston 51 are indicated at 55, 56 respectively. The leading and follower faces of piston 52 are indicated at 57, 58 respectively. Each groove 53 is arranged between the lengthwise median and inner side of the piston.

The pistons are arranged tandemwise and travel in a circular path. The pistons 39, 40 are alternately disposed with respect to pistons 51, 52. Piston 51 follows piston 39 and is arranged in advance of piston 40. Piston 39 follows piston 52. Piston 52 follows piston 50. The follower face of a leading piston of one impeller coacts with the leading face of a follower piston of the other impeller to provide a combustion space, as indicated at 59 and the spark plug 28 is positioned at such space. The follower face of a leading piston of one impeller coacts with the leading face of a follower piston of the other impeller to provide an exhaust receiving space, as at 60 with which the port 25 communicates. The follower face of a leading piston of one impeller coacts with the leading face of a follower piston of the other impeller to provide a space, as at 61 for the entrance of the combustible charge and into which opens the port 26. The spaces referred to are formed in the chamber 19.

Each impeller has as a part thereof a power transmission element which is coupled with a transmission mechanism. That element forming a part of impeller 33 is in the form of a solid shaft 62 and that which forms a part of impeller 34 is in the form of a tubular shaft 63. The shaft 62 extends through openings 5 and 38 and into collar 7, extends from section 4 to the transmission mechanism and is fixed to disc 35. The shaft 63 is of less length than and is mounted to revolve upon shaft 62. The shaft 63 is arranged in opening 47, fixed to disc 48 and extends through collar 9 to the transmission mechanism. The shaft 62 extends beyond the outer end of shaft 63. Packing retaining means 64 threadedly engages with the reduced end of collar 9 and encompasses shaft 63.

The housing 2 includes a pair of side walls 65, 66 and a top 67 removably connected to said walls. The side wall 65 is formed with a pair of superposed spaced enlargements 68, 69 formed with openings 70, 71 respectively and lubricant channels 72, 73 respectively leading to the walls of the openings 70, 71 respectively. The side wall 66 is formed with a pair of superposed enlargements 74, 75 formed with openings 76, 77 respectively and lubricant channels 78, 79 respectively leading to the walls of the openings 76, 77 respectively. The openings 70, 71 are arranged in alignment with the openings 76, 77 respectively. The opening 70 is of greater diameter than opening 76. The outer end of opening 76 in enlargement 74 is closed by a plate 80.

The shaft 62 extends across the chamber 81 provided by housing 2 and into the opening 76. The shaft 63 extends through opening 70 into chamber 81 to the extent that the end thereof arranged in said chamber is positioned between the vertical median of the latter and housing wall 65.

The transmission mechanism which is arranged within housing 2 includes a pair of oppositely disposed ring gear structures A, B. The structure A consists of a beveled ring gear 82 fixedly secured to and driven from shaft 63. The gear 82 is formed with a hub 83 which is directed towards wall 65. Surrounding hub 83 is a disc 103 which is secured to the non-toothed side of the body of and is carried with ring gear 82. The disc 103 constitutes a keeper for the ring gear structure A, is of greater diameter than ring gear 82 and is formed in its edge with a pair of diametrically opposed notches 104, 105. The notches of the disc 103 alternately coact with a locking device, to be hereinafter referred to for arresting movement of shaft 63 and ring gear structure A after each half revolution of the latter.

The ring gear structure B consists of a beveled ring gear 84 fixedly secured to and driven from shaft 62. The ring gear 84 opposes in spaced relation gear 82 and is oppositely disposed with respect to the latter. The gear 84 is formed with a hub 85 which is directed towards wall 66. Surrounding hub 85 is a disc 103' which is secured to the non-toothed side of the body of and is carried with ring gear 84. The disc 103' constitutes a keeper for the ring gear structure B, is of greater diameter than ring gear 84 and is formed in its edge with a pair of diametrically opposed notches 104', 105'. The notches of the disc 103' alternately coact with a locking device, to be hereinafter referred to for arresting movement of the shaft 62 and ring gear structure B after each half revolution of the latter.

The transmission mechanism also includes a gear wheel 86 revolubly mounted on shaft 62 between and of greater diameter than the ring gear 82, 84. The gear wheel 86 is formed with a pair of spaced parallel transversely disposed openings 87, 88. The body of gear wheel 86 has formed therein and diametrically thereof a pair of endwise opposed spaced sockets 89, 89' which communicate with the opening 87. Each of said sockets has one side open. The open sides of sockets 89, 89' are closed by a removable apertured plate 90 which is seated in and secured to the body of gear wheel 86. The aperture in plate 90 registers with the opening 87 and the latter is arranged between the open ends of sockets 89, 89'. The body of gear wheel 86 has formed therein and diametrically thereof a pair of endwise aligning spaced sockets 91, 91' which communicate with the opening 88. Each of the sockets 91, 91' has one side open. The open sides of sockets 91, 91' are closed by a removable apertured plate 92 which is seated in and secured to the body of gear wheel 86. The aperture in plate 92 registers with opening 88 and the latter is arranged between the open ends of sockets 91, 91'. Mounted in the openings 87, 88 are beveled pinions 93, 94 respectively which extend beyond each side of the body of gear wheel 86 inwardly with respect to the toothed edges of the latter. The pinions 93, 94 are fixedly secured to rotatable shafts 95, 96 respectively. The shaft 95 is journaled in the sockets 89, 89' and shaft 96 in the sockets 91, 91'.

A power transmitting shaft 97 extends through the openings 71, 77, and carries a fixed pinion 98 which is driven by the gear 86. Mounted on the shaft 97 is a pair of oppositely disposed cams 99, 100 between which is arranged the pinion 98.

Associated with the ring gear structures A and B are oppositely disposed locking devices 101, 102 respectively. The locking devices are of like construction and each of which includes a locking member 106 carried by a rock shaft 107 journalled in a support 108. The shaft 107 carries a crank arm 109 to which is attached a controlling spring 110 functioning to normally maintain the locking member 106 in a notch 104, 104', 105, 105'. The supports 108 are secured to housing 2 within housing 2 in proximity to shaft 97. The springs 110 are secured to the walls 65, 66. The cams 99, 100 associate with locking devices 101, 102 respectively.

As shown, the ring gear structure A is locked by the locking device 101 engaging in one of the notches of its disc 103 and that the locking device 102 has been released from disc 103' of ring gear structure B by the cam 100. The construction of the motor is such that one pair of pistons is permitted to travel at one time. The charge being combusted between pistons 39, 51, piston 39 will be forced downwardly on one side of chamber 19 and sweep the exhaust outwardly through port 35, at the same time as piston 40 moves upwardly on the other side of chamber 19 it will compress a charge between it and piston 51 and at the same time intaking another charge between it and piston 52. As disk 103' of ring gear structure B completes a half turn the cam 99 will force locking device 101 clear of disc 103 of ring gear structure A and the disc 103' of ring gear structure B will be locked by the locking device 102, thus holding disc 35 and pistons 39 and 40. The pistons of each pair are alternately driven and the impellers alternately locked. The operation as referred to with respect to piston 39 applies to the other pistons when driven. The impellers are alternately driven for the purpose of operating the transmission mechanism to drive shaft 97.

What I claim is:—

1. In a rotary motor, an inner and an outer alternately driven shaft, the former arranged within and extended from the ends of the latter, a pair of closely arranged parallel independent intermittently revoluble discs, each bodily carried by one of said shafts, a pair of diametrically opposed alternately operated pressure impelled pistons fixed to the outer edge of and disposed parallel to the axis of each disc and traveling in a circular path, the said several pistons arranged tandemwise and each for imparting a half revolution to a disc, the pistons carried by one disc being alternately disposed with respect to those carried by the other disc, a revoluble power transmitting member revolubly mounted on said inner shaft, a pair of rotatable pinions carried by said member, oppositely disposed alternately and intermittently operable ring gear structures permanently meshing with said pinions for continuously driving said member, one of said ring gear structures being bodily carried with one of said shafts and the other by the other of said shafts, a power transmitting shaft continuously driven from said member, oppositely disposed cams bodily carried with the power transmitting shaft, and releasable latching devices for and normally engaging in said ring gear structures, said devices arranged in the path of said cams and alternately held by the cams in released position with respect to said ring gear structures during one half revolution of the latter.

2. In a rotary motor, an inner and an outer alternately driven shaft, the former arranged within and extended from the ends of the latter, a pair of closely arranged parallel independent intermittently revoluble discs, each bodily carried by one of said shafts, a pair of diametrically opposed alternately operated pressure impelled pistons fixed to the outer edge of and disposed parallel to the axis of each disc and traveling in a circular path, the said several pistons arranged tandemwise and each for imparting a half revolution to a disc, the pistons carried by one disc being alternately disposed with respect to those carried by the other disc, a revoluble power transmitting member revolubly mounted on said inner shaft, a pair of rotatable pinions mounted to spaced relation within and extended from each side of said member, oppositely disposed alternately and intermittently operable ring gear structures permanently meshing with said pinions for continuously driving said member, said member being arranged between said structures, one of said ring gear structures being bodily carried with one of said shafts and the other by the other of said shafts, a power transmitting shaft continuously driven from said member, oppositely disposed cams bodily carried with the power transmitting shaft, each of said ring gear structures formed with a pair of diametrically opposed notches, and releasable spring controlled locking devices for and normally engaging in a notch of each of said ring gear structures to lock the latter from movement, said devices arranged in the path of said cams and alternately held by the cams in released position during one half revolution of the latter.

3. In a rotary motor, an inner and an outer alternately driven shaft, the former arranged within and extended from the ends of the latter, a pair of closely arranged parallel independent intermittently revoluble discs, each bodily carried by one of said shafts, a pair of diametrically opposed alternately operated pressure impelled pistons fixed to the outer edge of and disposed parallel to the axis of each disc and traveling in a circular path, the said several pistons arranged tandemwise and each for imparting a half revolution to a disc, the pistons carried by one disc being alternately disposed with respect to those carried by the other disc, a revoluble power transmitting member revolubly mounted on said inner shaft, a pair of revoluble pinions carried by said member, oppositely disposed alternately and intermittently operable ring gear structures permanently meshing with said pinions for continuously driving said member, one of said ring gear structures being bodily carried with one of said shafts and the other by the other of said shafts, said member being of disc like form and provided with teeth throughout its outer edge, a power transmitting shaft formed with a pinion permanently engaged by the teeth of and continuously driven from said member, oppositely disposed cams bodily carried with the power transmitting shaft, and releasable latching devices for and normally engaging in said ring gear structures, said devices arranged in the path of said cams and alternately held by the cams in released position with respect to said ring gear structures during one half revolution of the latter.

4. In a rotary motor, an inner and an outer alternately driven shaft, the former arranged within and extended from the ends of the latter, a pair of closely arranged parallel independent intermittently revoluble discs, each bodily carried by one of said shafts, a pair of diametrically opposed alternately operated pressure impelled pistons fixed to the outer edge of and disposed parallel to the axis of each disc and traveling in a circular path, the said several pistons arranged tandemwise and each for imparting a half revolution to a disc, the pistons carried by one disc being alternately disposed with respect to those carried by the other disc, a revoluble power transmitting member revolubly mounted on said inner shaft, a pair of rotatable pinions carried by said member, oppositely disposed alternately and intermittently operable ring gear structures permanently meshing with said pinions for continuously driving said member, one of said ring gear structures being bodily carried with one of said shafts and the other by the other of said shafts, said member being of disc like form and provided with teeth throughout its outer edge, a power transmitting shaft formed with a pinion permanently engaged by the teeth of and continuously driven from said member, oppositely disposed cams bodily carried with the power transmitting shaft, each of said ring gear structures formed with a pair of diametrically opposed notches, and releasable spring controlled locking devices for and normally engaging in a notch of each of said ring gear structures to lock the latter from movement, said devices arranged in the path of said cams and alternately held by the cams in released position one half revolution of the latter.

5. In a rotary motor, an inner and an outer alternately driven shaft, the former arranged within and extended from the ends of the latter, a pair of closely arranged parallel independent intermittently revoluble discs, each bodily carried by one of said shafts, a pair of diametrically opposed alternately operated pressure impelled pistons fixed to the outer edge of and disposed parallel to the axis of each disc and traveling in a circular path, the said several pistons arranged tandemwise and each for imparting a half revolution to a disc, the pistons carried by one disc being alternately disposed with respect to those carried by the other disc, a revoluble power transmitting member revolubly mounted on said inner shaft, a pair of rotatable pinions carried by said member, oppositely disposed alternately and intermittently operable ring gear structures permanently meshing with said pinions for continuously driving said member, one of said ring gear structures being bodily carried with one of said shafts and the other by the other of said shafts, a power transmitting shaft continuously driven from said member, oppositely disposed cams bodily carried with the power transmitting shaft, each of said ring gear structures including an integral disc formed with a pair of diametrically opposed notches, and a spring controlled locking device arranged adjacent each notched disc and normally engaging in a notch of the latter to lock the ring gear structure from movement, said devices arranged in the path of said cams and alternately held by the cams in released position with respect to said notched discs during one half revolution of said elements.

6. In a rotary motor, a revoluble power transmitting member provided with a pair of rotatable pinions, oppositely disposed alternately and intermittently driven ring gear structures permanently meshing with said pinions for continuously driving said member, a power transmitting shaft continuously driven from said member, oppositely disposed cams bodily carried with said shaft, and releasable spring controlled locking devices for and normally engaging in said ring gear structures, said devices arranged in the path of said cams and alternately held by the cams in released position with respect to said ring gear structures during one half revolution of the latter.

NEAL POWELL.